United States Patent
Koerber et al.

(10) Patent No.: US 10,852,407 B2
(45) Date of Patent: *Dec. 1, 2020

(54) IMAGING RADAR SENSOR WITH NARROW ANTENNA LOBE AND WIDE ANGLE-DETECTION RANGE

(71) Applicant: ASTYX GmbH, Ottobrunn (DE)

(72) Inventors: Richard Koerber, Hallerndorf (DE); Andre Giere, Oberpframmern (DE)

(73) Assignee: ASTYX GmbH, Ottobrunn ( * ) Notice: Subject to any disclaimer, the term of this patent is extended or adjusted under 35 U.S.C. 154(b) by 218 days.

This patent is subject to a terminal disclaimer.

(21) Appl. No.: 15/793,593

(22) Filed: Oct. 25, 2017

(65) Prior Publication Data

US 2018/0106895 A1    Apr. 19, 2018

Related U.S. Application Data

(63) Continuation of application No. 14/343,848, filed as application No. PCT/EP2012/003701 on Sep. 4, 2012, now Pat. No. 9,817,110.

(30) Foreign Application Priority Data

Sep. 4, 2012  (DE) .............................. 102011113018

(51) Int. Cl.
  *G01S 13/06*  (2006.01)
  *G01S 7/03*   (2006.01)
  (Continued)

(52) U.S. Cl.
  CPC .............. *G01S 13/06* (2013.01); *G01S 7/032* (2013.01); *G01S 13/34* (2013.01); *G01S 13/58* (2013.01);
  (Continued)

(58) Field of Classification Search
  CPC .......... G01S 13/06; G01S 13/34; G01S 13/58; G01S 13/931; G01S 7/032; H01Q 21/061
  (Continued)

(56) References Cited

U.S. PATENT DOCUMENTS 6,094,172 A    7/2000  Koscica
9,817,110 B2   11/2017 Koerber et al.
(Continued)

FOREIGN PATENT DOCUMENTS

DE    102004034429    2/2006
DE    10 2005 049772  4/2007
(Continued)

OTHER PUBLICATIONS

EP Office Action issued in European Application No. 12769898.3, dated Nov. 29, 2018, 9 pages.
(Continued)

*Primary Examiner* — Timothy X Pham
(74) *Attorney, Agent, or Firm* — Fish & Richardson P.C.

(57) ABSTRACT

The invention relates to a device for detecting objects within a sweep range, comprising at least two switchable transmitting antennas (10), a plurality of receiving antennas (20), the transmitting antennas (10) and receiving antennas (20) respectively extending longitudinally, parallel to one another, in a first direction (y), and the receiving antennas (10) being arranged in a row and the row extending in a second direction (x), the receiving antennas (20) and the transmitting antennas (10) being arranged such that they produce a synthetic receiving antenna array for the beam sweep by means of the sequential activation of the transmitting antennas and the positions of the transmitting and receiving antennas, the resulting distance corresponding to the positions of the receiving antennas in the synthetic receiving antenna array in the second direction d, the adja-
(Continued)

cent receiving antennas in the device being spaced apart by a distance of d2 or greater and d2 being twice as great as distance d.

14 Claims, 8 Drawing Sheets

(51) Int. Cl.
   *G01S 13/34* (2006.01)
   *G01S 13/931* (2020.01)
   *H01Q 21/06* (2006.01)
   *G01S 13/58* (2006.01)

(52) U.S. Cl.
   CPC ......... *G01S 13/931* (2013.01); *H01Q 21/061* (2013.01)

(58) Field of Classification Search
   USPC ........................................................ 342/104
   See application file for complete search history.

(56) References Cited

U.S. PATENT DOCUMENTS

| | | | |
|---|---|---|---|
| 2004/0027305 A1 | 2/2004 | Pleva et al. | |
| 2004/0246168 A1 | 12/2004 | Isaji | |
| 2004/0246183 A1 | 12/2004 | Chandler | |
| 2005/0275585 A1 | 12/2005 | Shima | |
| 2006/0066474 A1* | 3/2006 | Shirakawa | G01S 7/032 342/147 |
| 2008/0100510 A1 | 5/2008 | Bonthron et al. | |
| 2008/0291077 A1 | 11/2008 | Chang | |
| 2009/0051593 A1 | 2/2009 | Wiesbeck et al. | |
| 2010/0164784 A1* | 7/2010 | Longstaff | G01S 13/003 342/202 |
| 2011/0074620 A1* | 3/2011 | Wintermantel | G01S 7/032 342/70 |
| 2011/0080314 A1* | 4/2011 | Wintermantel | G01S 7/032 342/147 |
| 2015/0153445 A1 | 6/2015 | Jansen | |

FOREIGN PATENT DOCUMENTS

| | | |
|---|---|---|
| DE | 10 2007 039897 | 10/2008 |
| DE | 102008061932 | 7/2010 |
| DE | 102010002004 | 8/2011 |
| JP | H08334557 | 12/1996 |
| JP | H09-297173 | 11/1997 |
| JP | H11218574 | 8/1999 |
| JP | 2000230974 | 8/2000 |
| JP | 2000235073 | 8/2000 |
| JP | 2001183093 | 7/2001 |
| JP | 2003315447 | 11/2003 |
| JP | 2005-003393 | 1/2005 |
| JP | 2005-257384 | 9/2005 |
| JP | 2005257384 | 9/2005 |
| JP | 2006098181 | 4/2006 |
| JP | 2006-279525 | 10/2006 |
| JP | 2007333656 | 12/2007 |
| JP | 2009180650 | 8/2009 |
| JP | 2009297173 | 12/2009 |
| JP | 2010/217035 | 9/2010 |
| JP | 201021 2895 | 9/2010 |
| JP | 2011033498 | 2/2011 |
| WO | WO 2010/066458 | 6/2010 |

OTHER PUBLICATIONS

Japanese Office Action in Japanese Application No. 2017-132706, dated Jun. 19, 2018, 17 pages.
International Search Report for PCT/EP2012/003701 dated Feb. 14, 2013.
Kees et al., "Improvement of angular resolution of a millimeterwave imaging system by transmitter location multiplexing", Microwave Symposium Digest, MTT-S International Orlando, FL, USA May 16, 1995, pp. 969-972.
Office Action for corresponding Japanese Patent Application No. 2014-528892 dated Jul. 5, 2016 with English translation.
Korean Office Action in Application No. 10-2014-7007428, dated Dec. 12, 2017, 9 pages (with English translation).
CN Office Action in Chinese Appln. No. 201280055169, dated Jun. 2, 2015, 10 pages (with English translation).
CN Office Action in Chinese Appln. No. 201280055169, dated Mar. 9, 2016, 10 pages (with English translation).
DE Search Report in German Appln. No. 102011113018.0, dated Jan. 12, 2012, 6 pages (with English translation).
JP Office Action in Japanese Appln. No. 2014528892, dated Mar. 7. 2017, 6 pages (with English translation).
JP Office Action in Japanese Appln. No. 2017132706, dated Feb. 12, 2019, 8 pages (with English translation).
KR Office Action in Korean Appln. No. 20147007428, dated Jun. 25, 2018, 2 pages (with English translation).
Mayer, ""Abbildender Radarsensormit sendeseitig geschalteter Gruppenantenne," Dissertation, CuvillierVerlag, Göttingen 2008, ISBN 978-3-86727-565-1, S. 18, 19, 28, 29 and 94, 17 pages (with English translation)".
Ogawa et al., "Design of Millimeter-Wave Dual Mode Automotive Radar," The 2004 Institute of Electronics, Information and Communication Engineers Communication Society Proceedings, Japanese Institute of Electronics, Information and Communication Engineers, 2004, B-2-1, 208, 4 pages (with English translation).
PCT International Preliminary Report on Patentability in International Appln. No. PCT/EP2012/003701, dated Mar. 12, 2014, 11 pages.

\* cited by examiner

Theta / Grad vs. dB

IMAGING RADAR SENSOR WITH NARROW ANTENNA LOBE AND WIDE ANGLE-DETECTION RANGE

BACKGROUND OF THE DISCLOSURE

The invention relates to a device and a method for increasing the sweep range of the antenna beam of the receiving array of imaging radar sensors.

Millimetre wave radar sensors, e.g. for automotive applications with short distances, should also have, in addition to high distance and angular resolution, the widest possible angle detection range so that the number of sensors fitted around the vehicle can be reduced to a minimum.

The sensors are generally used for the "active safety" application and, in addition to pedestrian protection, also serve to support the driver in town traffic and in dense stop-start traffic.

The dissertation by Dr. Winfried Mayer entitled "Imaging radar sensor with antenna array connected on the transmitting side", Cuvillier Verlag, Goettingen 2008, ISBN 978-3-86727-565-1 discloses a method and a device which monitors an area with digital beam forming technology in which an antenna array with a number of transmitters and a number of receivers is used.

By means of the chronologically consecutive use of the transmitters the antenna opening angle can be reduced without the physical size of the receiving antenna thereby increasing.

In publication /1/ "N. Kees. E. Schmidhammer and J. Detlefsen "Improvement of angular resolution of a millimeterwave imaging system by transmitter location multiplexing" in IEEE MTT-S Int. Microw. Symp. Dig., Orlando, Fla. May 1995, vol. 2, pages 969-972" a method for producing a synthetic antenna aperture is described, with the aid of which the antenna beam width is reduced and so the angular resolution can be improved.

BRIEF SUMMARY OF THE DISCLOSURE

In an embodiment, a device for determining the position of objects is provided. The device includes at least two switchable transmitting antennas and a plurality of receiving antennas. The transmitting antennas and receiving antennas respectively extending longitudinally, parallel to one another, in a first direction. The receiving antennas are arranged in a row and the row extending in a second direction. Adjacent receiving antennas respectively being spaced apart from one another by a distance. The transmitting antennas are offset from one another in relation to the first direction and are spaced apart from one another by a distance in relation to the second direction. The distance between adjacent receiving antennas is at least twice as great as the distance between the transmitting antennas.

In an embodiment, a method for sweeping the beam of a radar sensor into extreme sweep angles is provided. The method includes sequential operation of two offset transmitting antennas and receiving the reflected signals by means of a receiving antenna array. The method also includes digitalisation of the received signals and overlapping arrangement of the signals of the receiving channels in order to form a synthetic array. The method also includes combining the received signals to form a bundled antenna beam by the digital beam forming method. The method also includes implementation of a speed correction, derived from the temporal offset between the two transmitted signals and speed filtering by means of a two-dimensional FFT by comparing output signals of overlapping lines of antennas which correspond to the bundled antenna beam.

BRIEF DESCRIPTION OF THE DRAWINGS

In the following exemplary embodiments of the invention are explained in more detail by means of figures. Parts corresponding to one another are provided with the same reference numbers in all of the figures.

DETAILED DESCRIPTION OF THE INVENTION

The purpose of the described methods is to reduce the antenna beam width by doubling the aperture with the aid of a synthetic array, but not to increase the maximum possible sweep angle.

The object of the invention is to make available a device, a method and a radar system wherein coupling by bringing the lines of antennas closer to one another is avoided, and so a wide sweep angle can be produced.

The object is achieved by the features of the independent claims.

The maximum possible sweep angle $\Phi max$ of a linear antenna array with the same distance between lines is calculated by the formula $$\Phi max = \arcsin\left[\frac{\lambda}{d} \times \left(1 - \frac{1}{N}\right) - 1\right] \quad (1)$$

with
$\lambda$: wavelength
d: distance between the individual lines
N: number of lines of antennas A typical wavelength $\lambda$ is 3.9 mm, and this corresponds to a transmission frequency of approximately 77 GHz. A typical distance between lines is between 1.5 or 1.8 mm and 3 mm.

It emerges from the formula that the shorter the distance between the lines of antennas, the greater the sweep angle.

With a so-called microstrip patch antenna in the millimetre wave range sweep angles of up to +/−40 degrees can generally be achieved. Moreover, the individual lines become closer to one another to such an extent that overcoupling, which can no longer be disregarded, occurs between the lines, and beam forming is no longer possible.

A radar sensor for detecting objects within a sweep range, with at least two switchable transmitting antennas and a plurality of receiving antennas is provided. The transmitting antennas and receiving antennas respectively extend longitudinally, parallel to one another, in a first direction.

The receiving antennas are arranged in a row. The row extends in a second direction. Adjacent receiving antennas are respectively spaced apart from one another by a distance d2 here.

In a first embodiment the transmitting antennas are offset from one another in relation to the first direction and are arranged a distance d apart from one another in relation to the second direction. The distance d2 between adjacent receiving antennas is at least twice as great, preferably twice as great, as the distance d between the transmitting antennas.

By means of the offset of the transmitting antennas it is possible to choose the distance between the transmitting antennas to be as small as is necessary for large sweep angles without the radiating characteristics of a transmitting antenna being greatly disrupted by the presence of the respective other transmitting antenna.

Preferably the following applies:

$$\arcsin\left[\frac{\lambda}{d} \times \left(1 - \frac{1}{N}\right) - 1\right] > 40°$$

the number of receiving antennas being N. Therefore, sweep angles of greater than 40 degrees are possible. A sweep angle is understood to be the deviation from the main beam direction. With a sweep angle of 70° one can sweep in the range of between −70° and +70°.

In the first embodiment a first of the transmitting antennas is fed such that the feeding in takes place in the second direction and a second of the transmitting antennas is fed such that the feeding in takes place contrary to the second direction.

It is thus possible in this embodiment to arrange the drivers for the two transmitting antennas adjacent to one another and then to branch off in two directions to the two transmitting antennas, by means of which the lines between the transmitting amplifiers and the transmitting antennas can be made as short as possible and at the same time as uniform as possible.

Figure 2:
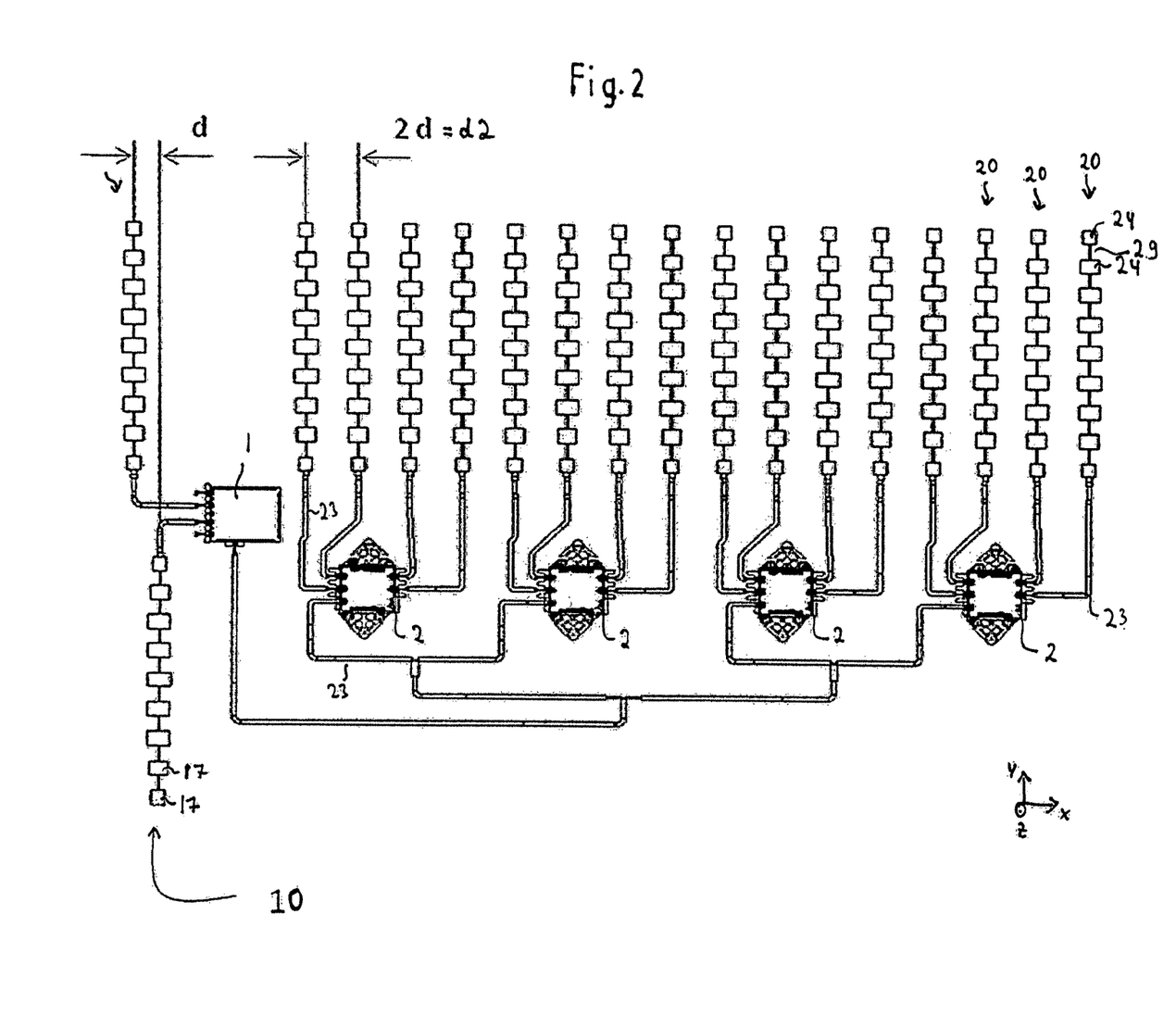
FIG. 2 shows the arrangement of the antennas of the radar sensor.

According to a further aspect of the application the device for sweeping the antenna lobe comprises at least 2 transmitting antennas, a number of multiple receiving antennas arranged the same distance apart from one another in a row—a so-called "linear uniform array", the transmitting antennas in this first embodiment being arranged a distance d apart from one another, this distance corresponding to half the distance between two receiving lines. So that no overcoupling occurs here between the two transmitting antennas, the latter are arranged lying opposite one another, as shown in FIG. 2.

Figure 3:
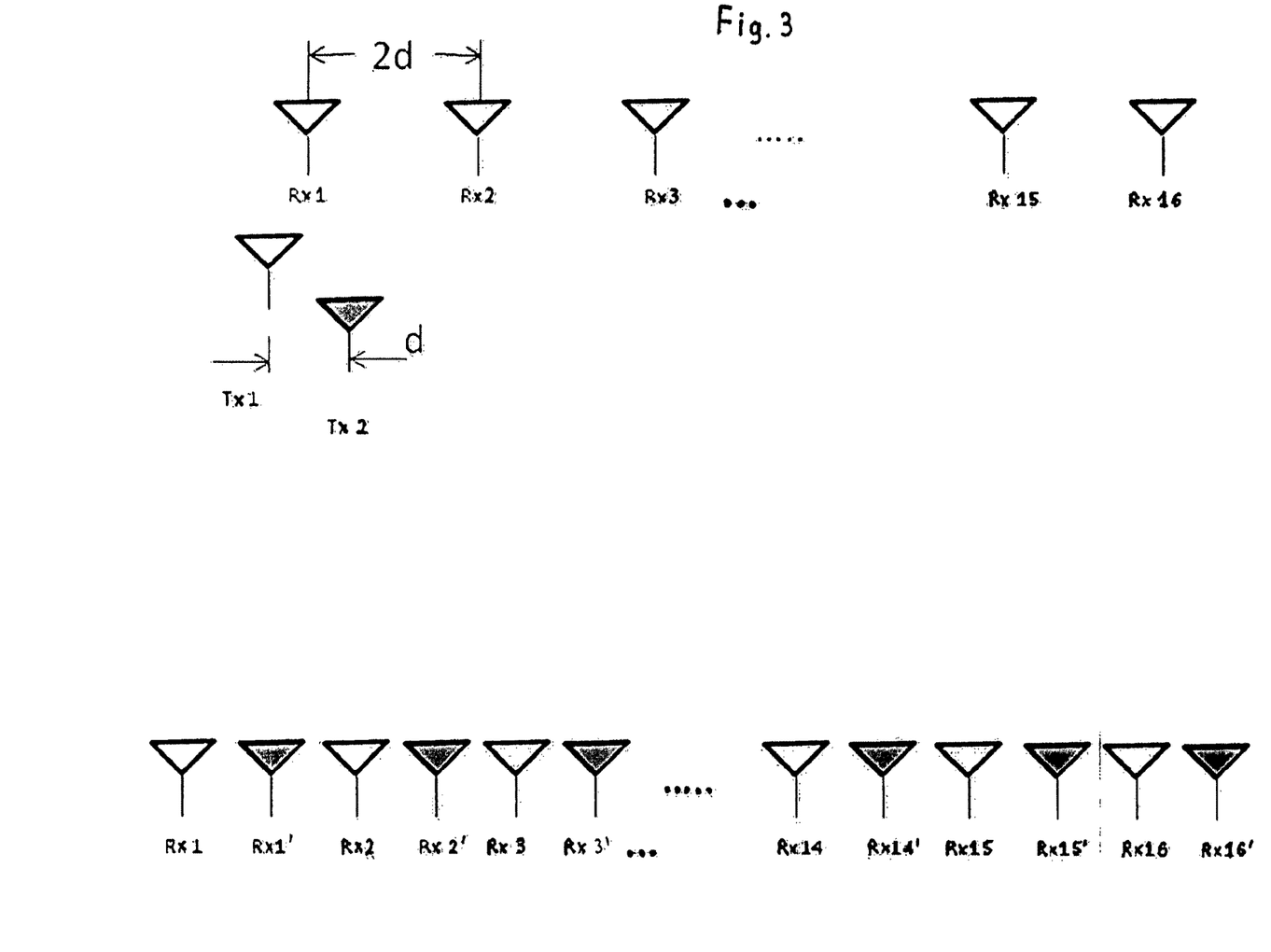
FIG. 3 shows the real aperture and the resulting synthetic arrangement according to a first embodiment.

In order to now produce, for example, a sweep angle of 70 degrees, the receiving antennas should not be arranged close together such that electromagnetic coupling, not to be disregarded, which would disrupt the diagram of the overall array, occurs between the individual antennas. In order to avoid this, according to the principle of "transmitter location multiplexing" as described in /1/, an artificial array is produced which comes to lie exactly between the receiving lines. Here the transmitters are operated consecutively in time and the received signals from the two measuring cycles are combined with one another. The result for the first embodiment corresponds to a synthetic array, as illustrated in FIG. 3. The phases of the received signals of the synthetic array with just one active transmitter correspond here to the phases of the real array with alternating transmitters.

With moved objects the beam sweep is falsified by the Doppler effect. This can be compensated by a Doppler filter with a subsequent correction calculation.

In an alternative embodiment the overlapping of real and synthetic receiving antenna lines is recorded metrologically by the Doppler phase shift, and so the correction calculation, as described in patent DE 102011113015.6 "Imaging radar sensor with synthetic enlargement of the antenna aperture and two-dimensional beam sweep", the content of which in this regard is also the subject matter of the present invention, is carried out.

The device further comprises a frequency generator for producing signals which are issued consecutively in time by the transmitting antennas, at least one processing unit for making at least one connection between the received signals issued by the receiving antennas by the digital beam forming method in order to produce a bundled antenna beam and a display device for showing the position of the object.

According to a further aspect of the application a device for sweeping the beam of a radar sensor into extreme sweep angles comprising at least two switchable transmitting antennas is provided. A number of multiple receiving antennas arranged in a row are provided here, the receiving antennas being arranged a distance apart from one another, this distance corresponding to double the distance that is required in order to sweep the beam clearly, the transmitting antennas in the first embodiment being arranged opposite and a distance apart, this distance corresponding to the distance required for a clear beam sweep.

Advantageously the number of receiving antennas that the device has is 8, 16 or 32.

According to an advantageous further development the position of the object can be shown by means of the display device with an antenna diagram.

Figure 1:
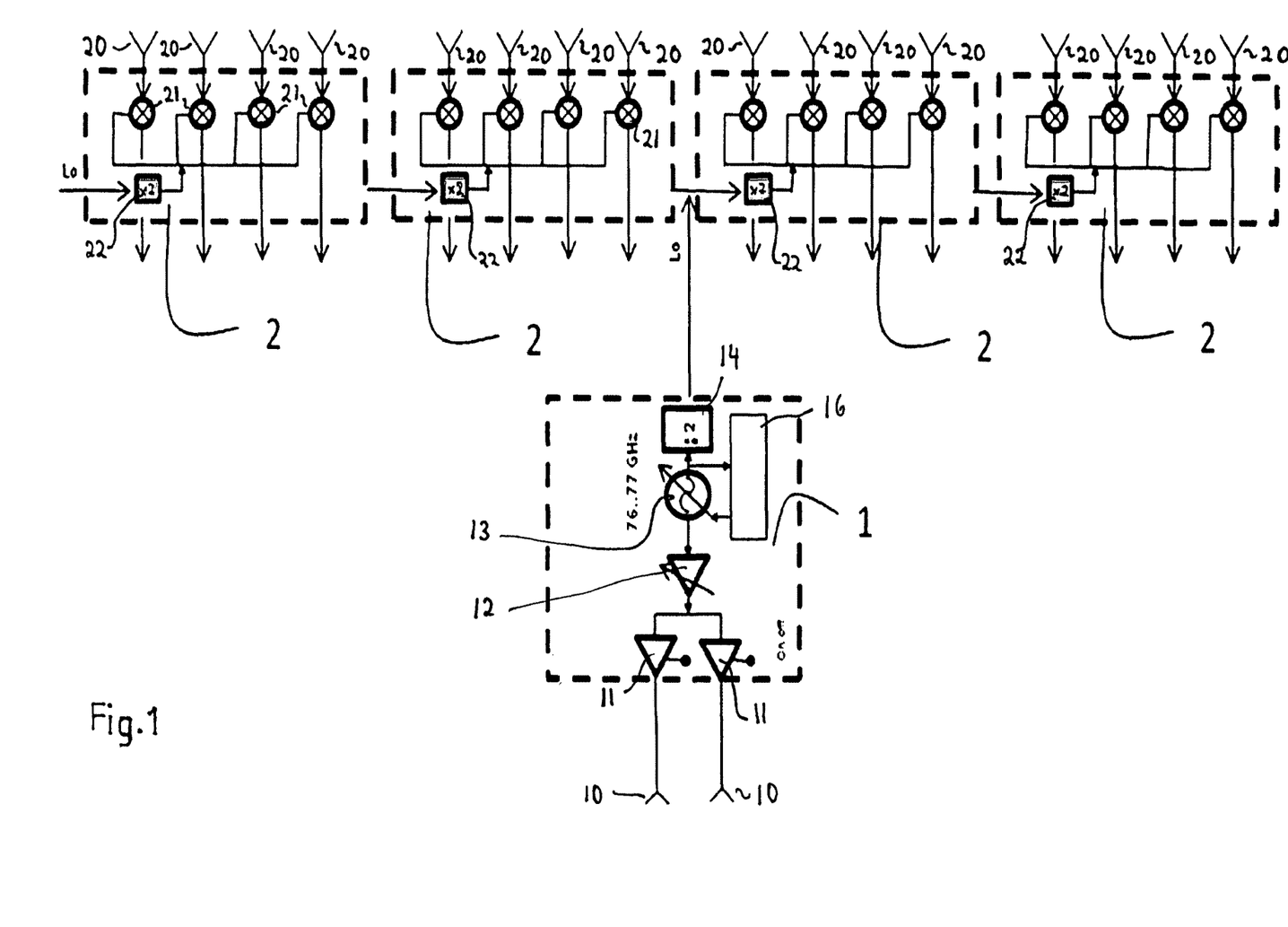
FIG. 1 shows schematically the functional blocks of a radar sensor.

The invention relates to a frequency-modulated continuous wave radar (FMCW radar) according to FIG. 1 which monitors an area with the aid of digital beam forming. The radar sensor consists here of a transmitter with two outputs and a number of, in this case sixteen, receivers. FIG. 1 shows a transmitter with an integrated frequency modulator and 2 switchable outputs and 4 receiver blocks each having four receiving channels. The received signals are mixed down to a base band in the receiver blocks.

FIG. 1 shows here a radar sensor comprising a transmitter (1), two transmitting antennas (10), four receiver blocks (2) and sixteen receiving antennas (20). The transmitter (1) contains a modulator (16), a frequency generator (13), a frequency divider (14), an adjustable amplifier (12) and two switchable drivers (11). The frequency generator (13) produces an output signal with a continuously varying frequency of between 76 and 77 GHz. The variation is brought about by the modulator (16). The output signal is issued to the amplifier (12), the amplitude of which can be adjusted. The output signal of the amplifier (12) is issued to the inputs of the two drivers (11) which can be switched on and off. The outputs of the drivers (11) respectively drive one of the transmitting antennas (10).

The frequency generator (13) of the transmitter (1) also issues at its output a signal to the frequency divider (14) which issues an output signal which has half the frequency of the output signal of the frequency generator.

The receiver blocks (2) respectively contain a frequency multiplier (22) and four mixers (21). The frequency multipliers (22) receive the output signal of the frequency divider (14) of the transmitter (1), respectively produce a signal with double the frequency of their input signal, and respectively issue their generated signals to first inputs of the mixers (21). The mixers (21) are respectively connected to second inputs with respectively one receiving antenna (20) so that the signal received by the receiving antenna is respectively mixed down to a base band in the mixer (21). The output signals of the mixers (21) are evaluated in a processing unit not shown in FIG. 1.

FIG. 2 shows the physical arrangement of the antennas in a first embodiment. Here it shows the arrangement of the transmitting antennas (10) and the receiving antennas (20) in a top view. The transmitting antennas (10) and the receiving antennas (20) are made in the form of patch antennas which extend in an x-y plane. The receiving antennas (20) respectively have so-called lines of antennas (28) which respectively consist of nine receiving beam elements (24) and connection lines lying in between. The receiving beam elements (24) of a line of antennas (28) are lined up one behind the other so that the line of antennas (28) is elongate and extends in the y direction. The lines of antennas (28) from the receiving antenna (20) all run parallel to one another and are located at the same level in relation to the y direction. The lines of antennas (28) are therefore arranged next to one another in relation to the x direction, the outer lines of antennas being designated as the right line of antennas or as the left line of antennas.

The z direction points upwards out of the page of the drawing. The z direction is the direction in which objects are to be detected. If, for example, the radar sensor is used in a land vehicle and is supposed to detect objects in the direction of travel, the z direction is the direction of travel.

The lines of antennas (28) respectively have a feed-in point with which they are connected to an input of the receiver block (2) by means of a strip line (23). The receiving antennas (20) respectively have just one line of antennas (28) so that only one line of antennas (28) respectively is connected to an input of a receiver block (2) by means of its respective feed-in point.

The two transmitting antennas (10) respectively contain a line of antennas (18). The lines of antennas (18) respectively have transmitter beam elements (17) and connection lines lying in between. The transmitter beam elements (17) of a line of antennas (18) are lined up one behind the other so that the line of antennas (18) is elongate and extends in the y direction. The lines of antennas (18) all run parallel to one another. However, the lines of antennas (18) are offset from one another in relation to the first direction (y). In relation to the second direction (x) the lines of antennas (10) are a distance d apart from one another. The distance is always related to the phase focal points of the respective lines of antennas.

The distance d2 between adjacent receiving antennas (20) is twice as large as the distance d between the transmitting antennas (10).

A first of the transmitting antennas (10) is fed such that the feeding in takes place in the first direction y and a second of the transmitting antennas (10) is fed such that the feeding in takes place contrary to the first transmitting antenna in direction (y).

The transmitting antennas and the receiving antenna array typically have a vertical beam width of 10 degrees. The horizontal beam width of the transmitter is configured such that the desired detection range of +/−70 degrees is approximately illuminated. The same applies to the horizontal beam width of the individual lines of the receiving array.

The received signals are converted into the base band and digitalised by the recipient in phase. The signals radiated by the alternating transmitting antennas, reflected and received are now combined in the subsequent signal processor to form the synthetic array. The beam forming and sweep are now implemented by the "digital beam forming' method.

FIG. 3 shows the real aperture and the resulting synthetic arrangement according to a first embodiment.

In order to reduce the secondary lobe of the antenna array the signals of the individual lines are first of all weighted. This typically takes place according to a so-called "Dolph-Chebyshev" function.

Figure 4:
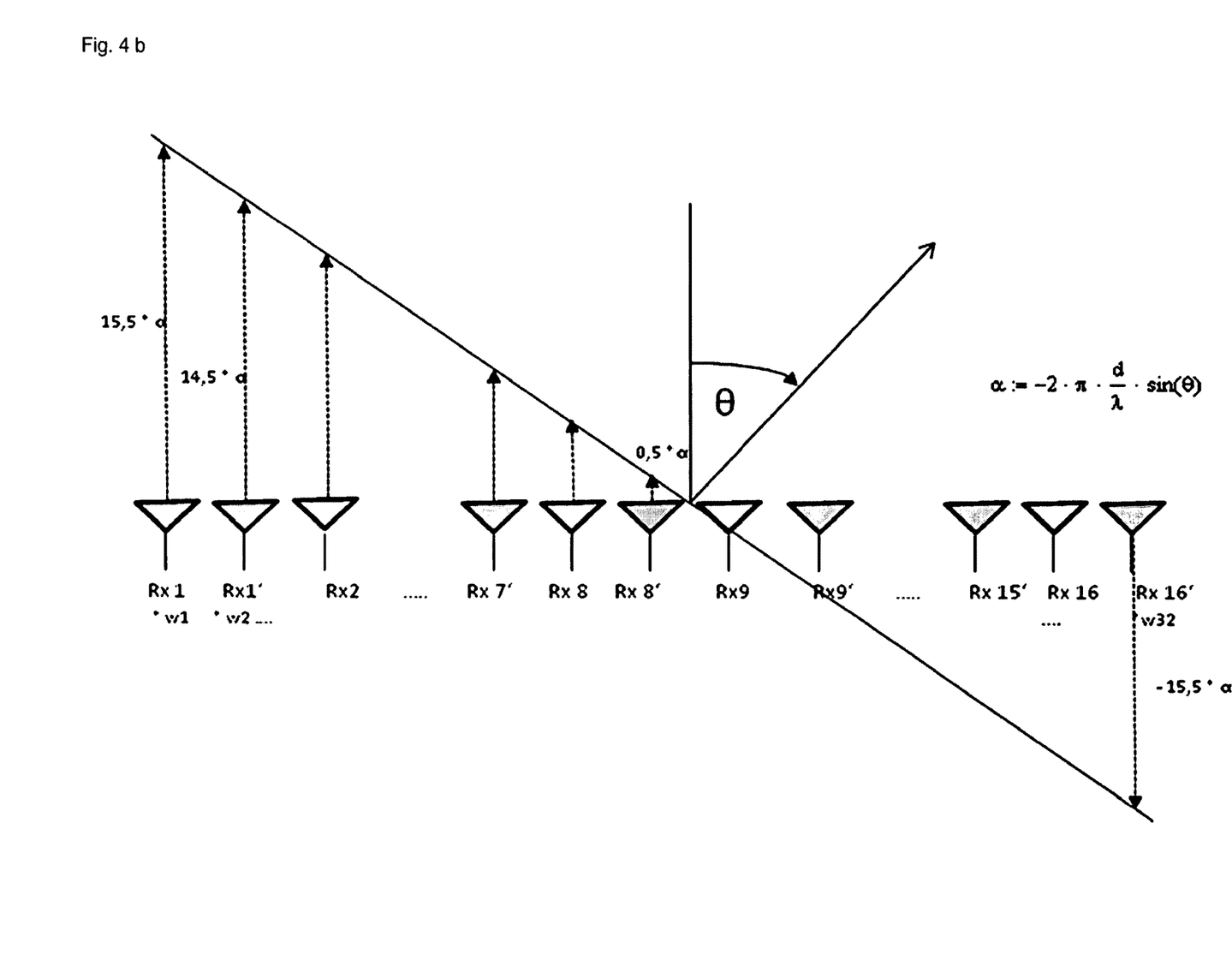
Figure 4A:
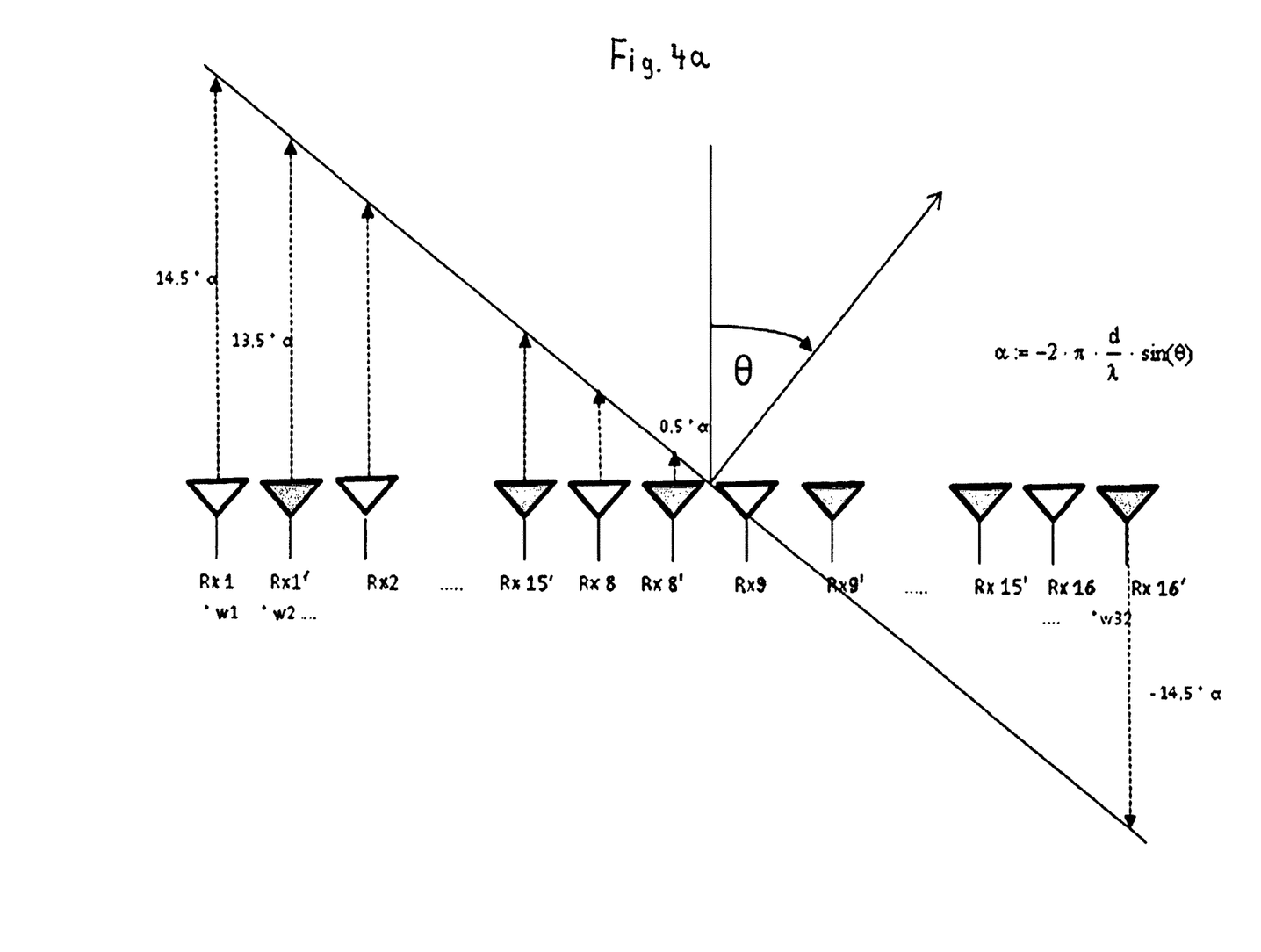
FIGS. 4a, b illustrate how a beam sweep is implemented.

If a beam sweep by the angle θ is now to be carried out, the signals of the individual lines are to be shifted in the phase by a multiple of the angle α according to the method outlined in FIGS. 4a and 4b. The angle α is calculated by the formula $$\alpha = -2*\pi*\frac{d}{\lambda}*\sin\theta$$

with
λ: wavelength
d: distance between the lines of the synthetic array

Figure 5:
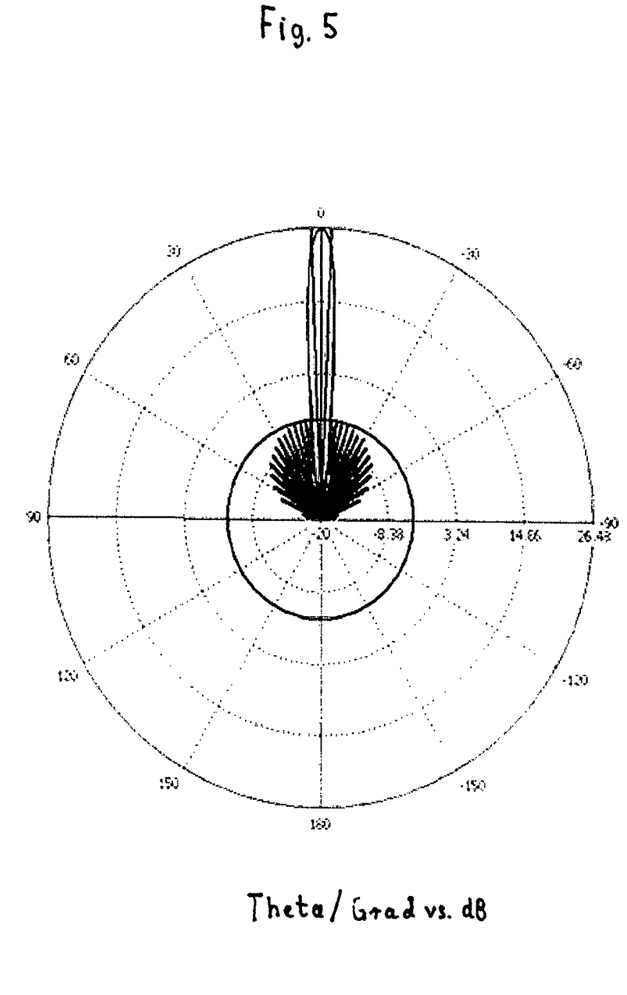
FIG. 5 shows an antenna diagram without beam sweep.
Figure 6:
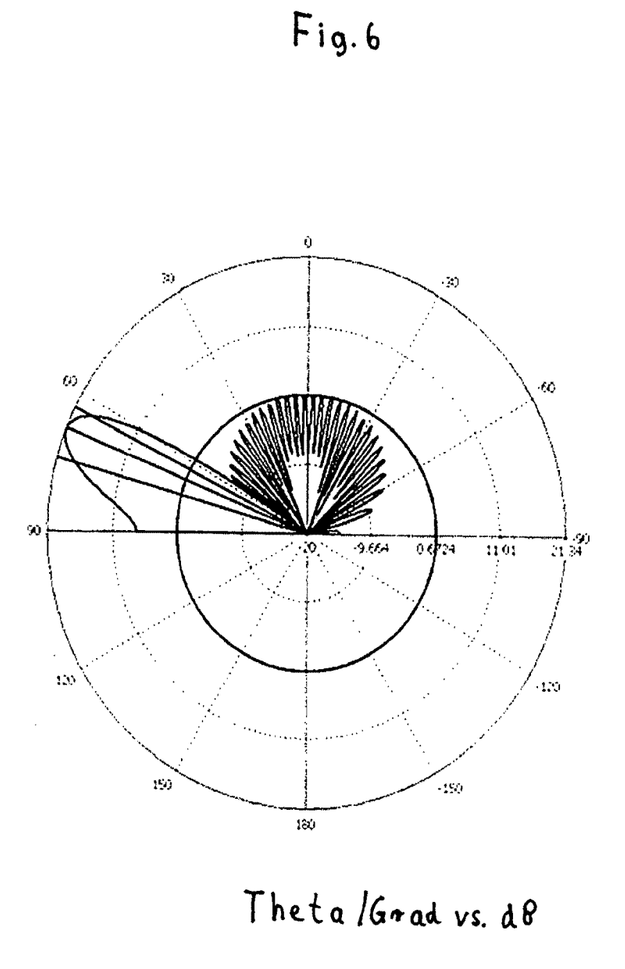
FIG. 6 shows an antenna diagram with a strong beam sweep.

FIG. 5 shows the antenna diagram without beam sweep. In FIG. 6 the antenna diagram can be seen with an extreme sweep angle of 70°. Due to the oblique angle of vision widening of the antenna beam first of all takes place. Furthermore, the antenna gain is reduced because the diagrams of the individual lines also have a reduced gain with this extreme angle. Likewise, the secondary lobes rise. Nevertheless, the diagram is sufficiently good in order to recognise objects on the outer edge of the detection range. The angle measurement accuracy is reduced here according to the widening of the main lobe of the array diagram.

Figure 7:
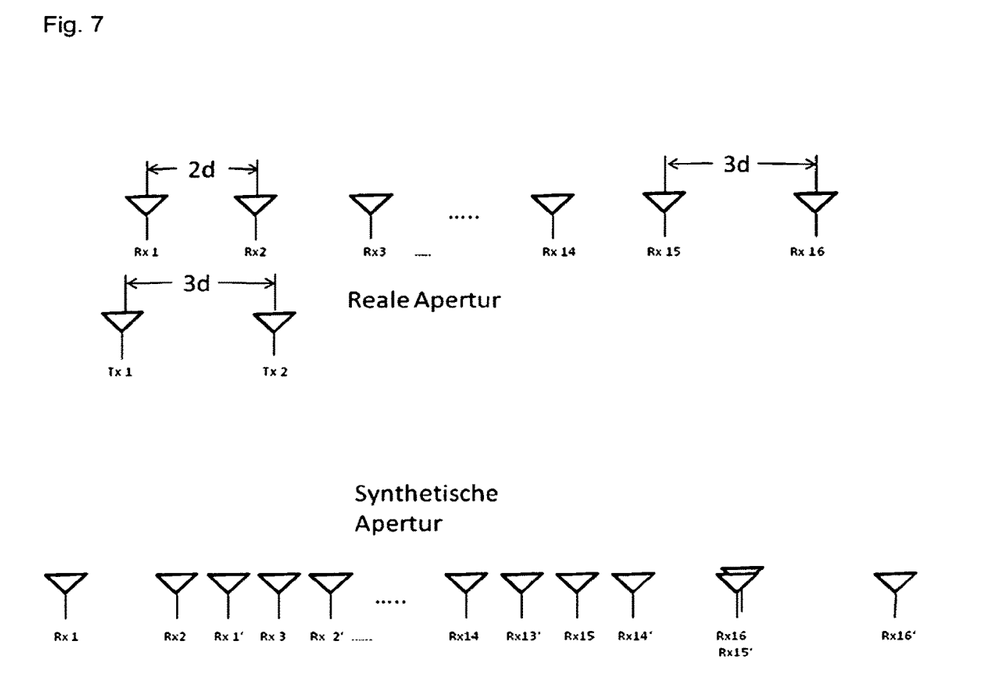
FIG. 7 shows the real aperture and the resulting synthetic arrangement according to an alternative embodiment.

FIG. 7 shows the real aperture and the resulting synthetic arrangement with the lines of antennas used for the beam sweep according to an alternative embodiment. In the alternative embodiment. The distance d3 of three times d between the transmitting antennas Tx1 and Tx2 in a second direction results in the lines of antennas lying on the outside in the synthetic array with a distance of greater than d from the next line of antennas lying on the inside not being able to be taken into account for the beam sweep because they do not meet the criterion for the extreme sweep angle.

Furthermore, the alternative embodiment shows the conversion of the arrangement of the lines of receiving antennas by an outer one spaced apart from the next line of antennas lying on the inside by d3 in a second direction, and this enables overlapping of the received signal in the synthetic array in order to correct the speed. If a beam sweep by the angle θ is now to be carried out, the signals of the individual lines are to be shifted by a multiple of the angle α in the phase by the method outlined in FIG. 8 for the received signals taken into account for the beam sweep.

Figure 8:
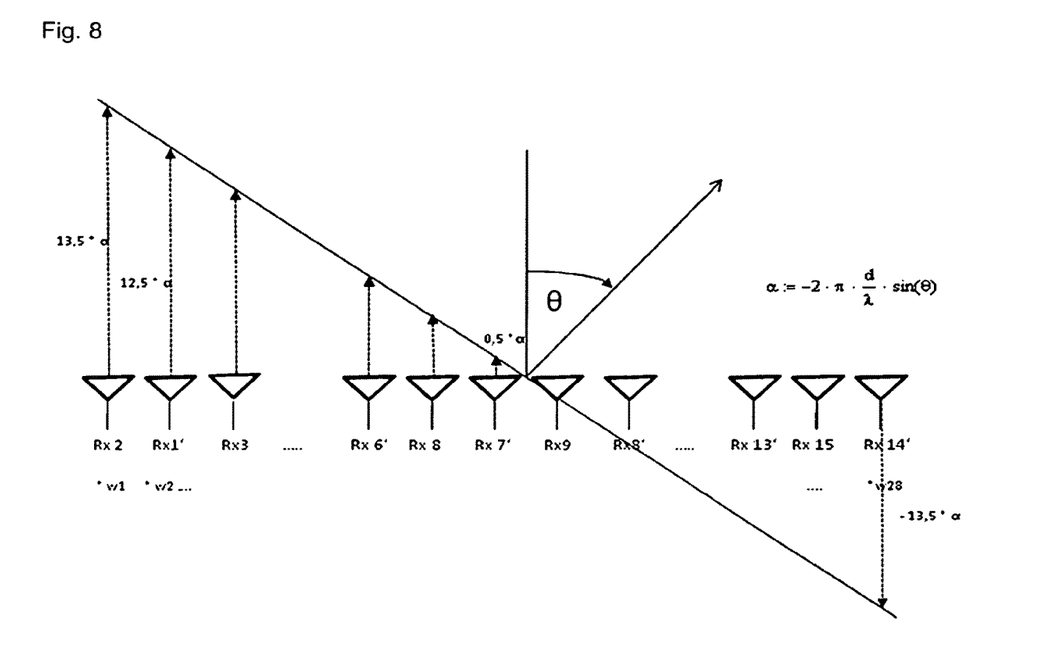
FIG. 8 illustrates how a beam sweep is implemented in the alternative embodiment with an overlapping receiving antenna into a synthetic antenna array.

Angle α is calculated by the formula $$\alpha = -2*\pi*\frac{d}{\lambda}*\sin\theta$$

with
λ: wavelength
d: distance between the lines of the synthetic array

LIST OF REFERENCE NUMBERS 1 transmitter
2 receiver circuit 10 transmitting antenna
11 driver
12 amplifier
13 frequency generator
14 frequency divider
16 modulator
17 transmitting array element
20 receiving antenna
21 mixer
22 frequency divider
23 strip line
24 receiving array element
25 chip

The invention claimed is:

1. A method comprising:
transmitting signals by sequentially operating two transmitting antennas offset from one another along a first direction by a first distance;
receiving reflected signals using a receiving antenna array, wherein the receiving antenna array comprises a plurality of receiving antennas arranged in a row extending in the first direction, and wherein adjacent antennas are offset from one another along the first direction by a second distance, the second distance being twice as great as the first distance;
digitizing the received signals;
processing the received signals according to a synthetic array, wherein the synthetic array comprises a plurality of lines arranged in a row extending in the first direction, each line corresponding to a respective one of the transmitting antennas and a respective one of the receiving antennas; and
reducing a secondary lobe of the synthetic array, wherein reducing the secondary lobe of the synthetic array comprises weighting one or more lines of the synthetic array according to a Dolph-Chebyshev function.

2. The method of claim 1, further comprising performing a beam sweep by an angle θ with respect to the synthetic array.

3. The method of claim 2, wherein performing the beam sweep by the angle θ with respect to the synthetic array comprises phase shifting one or more lines of the synthetic array.

4. The method of claim 3, wherein each of the lines of the synthetic array are phase shifted by a multiple of an angle α.

5. The method of claim 4, wherein the angle α is determined based on a wavelength of the received signals and a distance between adjacent lines of the synthetic array.

6. The method of claim 4, wherein the angle α is determined as:

$$\alpha = -2\pi \frac{d}{\lambda} \sin\theta,$$

wherein λ is a wavelength of the received signals, and d is a distance between adjacent lines of the synthetic array.

7. The method of claim 4, wherein a first line at an end of the synthetic array is phase shifted by N multiplied by α, and wherein a second line at an opposite end of the synthetic array is phase shifted by −N multiplied by α.

8. A system comprising:
two transmitting antennas offset from one another along a first direction by a first distance, wherein the two transmitting antennas are configured to be sequentially operated to transmit signals;
a receiving antenna array comprising a plurality of receiving antennas arranged in a row extending in the first direction, wherein adjacent antennas are offset from one another along the first direction by a second distance, the second distance being twice as great as the first distance, and wherein the receiving antenna array is configured to receive reflected signals; and
a signal processor configured to:
digitize the received signals;
process the received signals according to a synthetic array, wherein the synthetic array comprises a plurality of lines arranged in a row extending in the first direction, each line corresponding to a respective one of the transmitting antennas and a respective one of the receiving antennas; and
reduce a secondary lobe of the synthetic array.

9. The system of claim 8, wherein the signal processor is further configured to perform a beam sweep by an angle θ with respect to the synthetic array.

10. The system of claim 9, wherein performing the beam sweep by the angle θ with respect to the synthetic array comprises phase shifting one or more lines of the synthetic array.

11. The system of claim 10, wherein each of the lines of the synthetic array are phase shifted by a multiple of an angle α.

12. The system of claim 11, wherein the angle α is determined based on a wavelength of the received signals and a distance between adjacent lines of the synthetic array.

13. The system of claim 11, wherein the angle α is determined as:

$$\alpha = -2\pi \frac{d}{\lambda} \sin\theta,$$

wherein λ is a wavelength of the received signals, and d is a distance between adjacent lines of the synthetic array.

14. The system of claim 11, wherein a first line at an end of the synthetic array is phase shifted by N multiplied by α, and wherein a second line at an opposite end of the synthetic array is phase shifted by −N multiplied by α.

* * * * *

UNITED STATES PATENT AND TRADEMARK OFFICE
CERTIFICATE OF CORRECTION

PATENT NO. : 10,852,407 B2
APPLICATION NO. : 15/793593
DATED : December 1, 2020
INVENTOR(S) : Richard Koerber and Andre Giere Page 1 of 1

It is certified that error appears in the above-identified patent and that said Letters Patent is hereby corrected as shown below:

On the Title Page

Item (30), Column 1, Line 1, delete "Sep. 4, 2012" and insert -- Sep. 9, 2011 --, therefor.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*